United States Patent
Hanscom

(10) Patent No.: US 10,223,310 B2
(45) Date of Patent: *Mar. 5, 2019

(54) MULTI-SOURCE FLOW MANAGEMENT USING ELASTIC FIFO STRUCTURES

(71) Applicant: International Business Machines Corporation, Armonk, NY (US)

(72) Inventor: Jeffrey C. Hanscom, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,221

(22) Filed: Aug. 7, 2017

(65) Prior Publication Data

US 2018/0081838 A1 Mar. 22, 2018

Related U.S. Application Data

(63) Continuation of application No. 15/272,858, filed on Sep. 22, 2016, now Pat. No. 9,798,685.

(51) Int. Cl.
*G06F 13/42* (2006.01)
*G06F 13/362* (2006.01)
(Continued)

(52) U.S. Cl.
CPC .......... *G06F 13/362* (2013.01); *G06F 13/385* (2013.01); *G06F 13/4068* (2013.01); *G06F 13/4282* (2013.01); *G06F 2213/0026* (2013.01)

(58) Field of Classification Search
USPC ......... 710/104–110, 305–317; 713/500–503; 711/147–148
See application file for complete search history.

(56) References Cited

U.S. PATENT DOCUMENTS 6,754,743 B2   6/2004  Maessen
7,080,169 B2   7/2006  Tang et al.
(Continued)

OTHER PUBLICATIONS

List of IBM Patents or Patent Applications Treated as Related, Aug. 8, 2017, 2 pages.

(Continued)

*Primary Examiner* — Raymond N Phan
(74) *Attorney, Agent, or Firm* — Cantor Colburn LLP; Steven Chiu

(57) ABSTRACT

A system includes an input/output adapter that includes a multi-source selector coupled to a flow-through input, an elastic first-in-first-out (FIFO) structure, a completion queue, and an output bus. A controller is operatively connected to the input/output adapter. The controller is operable to select the flow-through input to pass through the multi-source selector to the output bus based on determining that the elastic FIFO structure is empty. The elastic FIFO structure is selected to pass through the multi-source selector to the output bus based on determining that the elastic FIFO structure includes at least one entry. The completion queue is selected to pass through the multi-source selector to the output bus based on determining that the completion queue includes at least one entry. The flow-through input is routed into the elastic FIFO structure based on the completion queue being selected to pass through the multi-source selector to the output bus.

20 Claims, 7 Drawing Sheets

(51) Int. Cl.
    *G06F 13/40*     (2006.01)
    *G06F 13/38*     (2006.01)

(56) References Cited

U.S. PATENT DOCUMENTS 8,429,661 B1     4/2013   Alfieri et al.
9,798,685 B1 *  10/2017  Hanscom .............. G06F 13/362

OTHER PUBLICATIONS

U.S. Appl. No. 15/276,911, filed Sep. 27, 2016, Entitled: Cut-Through Buffer With Variable Frequencies, First Named Inventor: Jeffrey C. Hansom.

U.S. Appl. No. 15/272,858, filed Sep. 22, 2016, Entitled: Multi-Source Data Insertion Using an Elastic FIFO, First Named Inventor: Jeffrey C. Hansom.

U.S. Appl. No. 15/272,974, filed Sep. 22, 2016, Entitled: Processing of Inbound Back-To-Back Completions in a Communication System, First Named Inventor: Jeffrey C. Hansom.

U.S. Appl. No. 15/275,529, filed Sep. 26, 2016, Entitled: Multi-Packet Processing With Ordering Rule Enforcement, First Named Inventor: Jeffrey C. Hansom.

U.S. Appl. No. 15/275,531, filed Sep. 26, 2016, Entitled: Simultaneous Inbound Multi-Packet Processing, First Named Inventor: Jeffrey C. Hansom.

U.S. Appl. No. 15/594,784, filed May 15, 2017, Entitled: Multi-Packet Processing With Ordering Rule Enforcement, First Named Inventor: Jeffrey C. Hansom.

* cited by examiner

MULTI-SOURCE FLOW MANAGEMENT USING ELASTIC FIFO STRUCTURES

DOMESTIC PRIORITY

This application is a continuation of U.S. patent application Ser. No. 15/272,858 filed Sep. 22, 2016, the contents of which are incorporated by reference herein in its entirety.

BACKGROUND

Aspects are related generally to computer-based communication systems, and more specifically to insertion of data in a multi-source data processing pipeline with an elastic FIFO in a computer system.

Peripheral component interconnect express (PCIe) is a component level interconnect standard that defines a bi-directional communication protocol for transactions between input/output (I/O) adapters and host systems. PCIe communications are encapsulated in packets according to the PCIe standard for transmission on a PCIe bus. Packets originating at I/O adapters and ending at host systems are referred to as upbound packets. Packets originating at host systems and terminating at I/O adapters are referred to as downbound packets. PCIe transactions include a request packet and, if required, a completion packet (also referred to herein as a "response packet") in the opposite direction. The PCIe topology is based on point-to-point unidirectional links that are paired (e.g., one upbound link, one downbound link) to form the PCIe bus.

PCIe and other communication protocols can use "credits" to limit the rate of requests and ensure that outstanding requests can be serviced before accepting new requests. In a high-bandwidth data pipeline, where there are multiple individual and separately controlled requesters for a destination port, dataflow on main interfaces can be controlled by a credit scheme. A main dataflow path can move gap-less data indefinitely and an "other" source must be able to insert into the data stream within a reasonable time frame. It is desirable to maintain the gap-less data stream before, during, and after insertion. It is also desirable to reduce the main dataflow path latency in the normal case (i.e., no insertion).

SUMMARY

According to one embodiment, a system includes an input/output adapter that includes a multi-source selector coupled to a flow-through input, an elastic first-in-first-out (FIFO) structure, a completion queue, and an output bus. The multi-source selector is a data path multi-source selector, the flow-through input is a data path flow-through input, the elastic FIFO structure is a data path elastic FIFO structure, and the output bus is a data path output bus. The input/output adapter also includes a header path multi-source selector coupled to a header path flow-through input, a header path elastic FIFO structure, the completion queue, and a header path output bus. A controller is operatively connected to the input/output adapter. The controller is operable to select the flow-through input to pass through the multi-source selector to the output bus based on determining that the elastic FIFO structure is empty. The elastic FIFO structure is selected to pass through the multi-source selector to the output bus based on determining that the elastic FIFO structure includes at least one entry. The completion queue is selected to pass through the multi-source selector to the output bus based on determining that the completion queue includes at least one entry. The flow-through input is routed into the elastic FIFO structure based on the completion queue being selected to pass through the multi-source selector to the output bus.

According to an embodiment, a method includes selecting, by a controller operatively connected to an input/output adapter, a flow-through input to pass through a multi-source selector to an output bus based on determining that an elastic FIFO structure is empty, where the multi-source selector of the input/output adapter is coupled to the flow-through input, the elastic FIFO structure, a completion queue, and the output bus. The multi-source selector is a data path multi-source selector, the flow-through input is a data path flow-through input, the elastic FIFO structure is a data path elastic FIFO structure, and the output bus is a data path output bus. The input/output adapter also includes a header path multi-source selector coupled to a header path flow-through input, a header path elastic FIFO structure, the completion queue, and a header path output bus. The elastic FIFO structure is selected to pass through the multi-source selector to the output bus based on determining that the elastic FIFO structure includes at least one entry. The completion queue is selected to pass through the multi-source selector to the output bus based on determining that the completion queue includes at least one entry. The flow-through input is routed into the elastic FIFO structure based on the completion queue being selected to pass through the multi-source selector to the output bus.

According to an embodiment, a computer program product includes a computer readable storage medium having program instructions embodied therewith. The program instructions are executable by a processing circuit of a controller to cause the processing circuit to perform selecting, by the controller operatively connected to an input/output adapter, a flow-through input to pass through a multi-source selector to an output bus based on determining that an elastic FIFO structure is empty, where the multi-source selector of the input/output adapter is coupled to the flow-through input, the elastic FIFO structure, a completion queue, and the output bus. The multi-source selector is a data path multi-source selector, the flow-through input is a data path flow-through input, the elastic FIFO structure is a data path elastic FIFO structure, and the output bus is a data path output bus. The input/output adapter also includes a header path multi-source selector coupled to a header path flow-through input, a header path elastic FIFO structure, the completion queue, and a header path output bus. The elastic FIFO structure is selected to pass through the multi-source selector to the output bus based on determining that the elastic FIFO structure includes at least one entry. The completion queue is selected to pass through the multi-source selector to the output bus based on determining that the completion queue includes at least one entry. The flow-through input is routed into the elastic FIFO structure based on the completion queue being selected to pass through the multi-source selector to the output bus.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments provide insertion of data in a multi-source data processing pipeline with one or more elastic first-in-first-out (FIFO) structures. An elastic FIFO reduces latency typically associated with buffers and latches. Embodiments allow a main dataflow (e.g., a flow-through input) to run with a reduced latency under normal conditions (i.e., it does not pass through a buffer or latch stage). An "other" interface can insert at a "next" packet boundary regardless of the main dataflow behavior (i.e., low latency insertion). The main dataflow only passes into elastic FIFO structures (e.g., a data path elastic FIFO structure and a header path elastic FIFO structure) if a packet starts when currently inserting from the other interface. The main flow "catches up" when an in-flight packet empties from the elastic FIFO structures. Credit return logic can be timed to perform a credit update to compensate for the depth of the elastic FIFO structures at the deepest point. Multiple packet types can be supported for an insert completion, a consume completion credit, an absorb completion, and the like.

Figure 1:
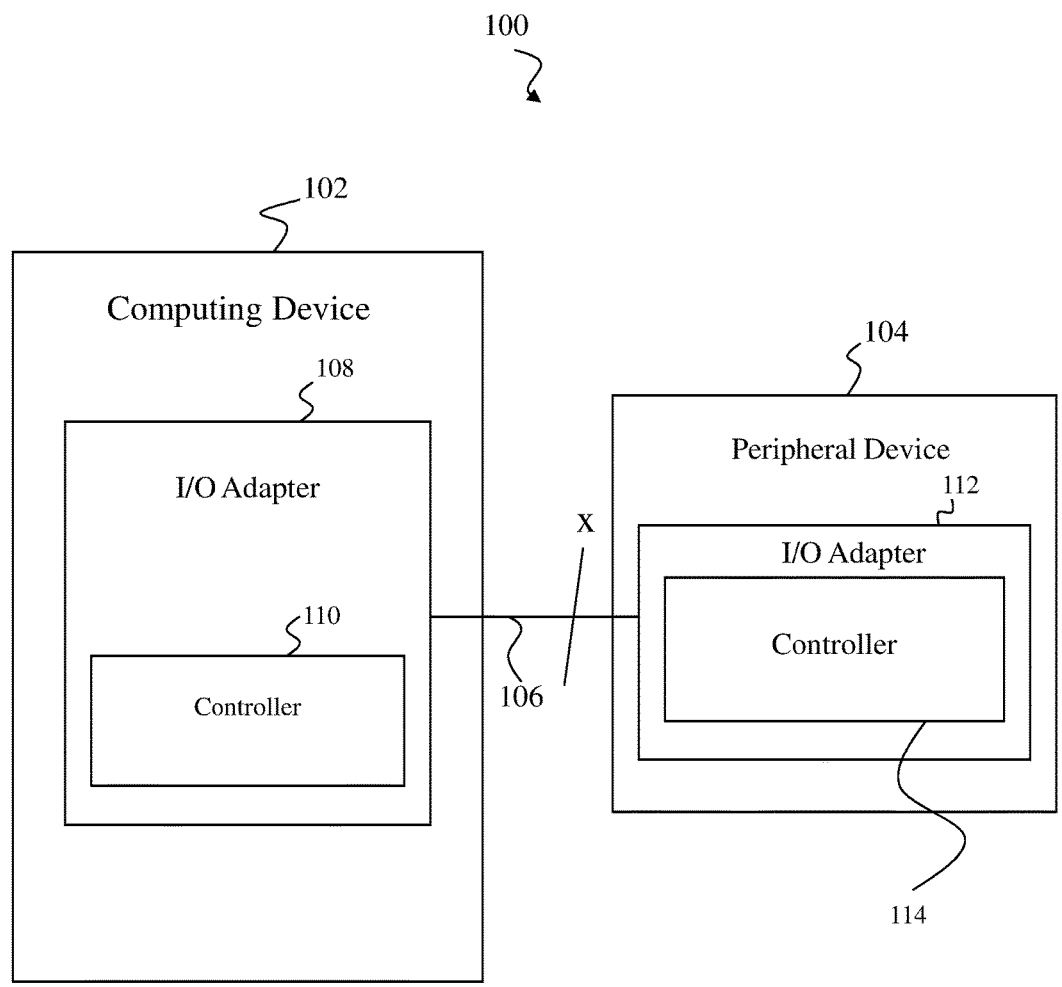
FIG. 1 illustrates a system in accordance with an embodiment.

FIG. 1 illustrates a system 100 on which embodiments may operate. The system 100 includes a computing device 102 and a peripheral device 104. The computing device 102 may be any type of computing device, such as, for example, a personal computer or a server. The computing device 102 performs operations and generates commands and data for transmission to the peripheral device 104. The computing device 102 may be referred to herein as a "root" or a "root complex". The peripheral device 104 may be any type of device capable of receiving commands and data from the computing device 102. For example, the peripheral device 104 may be a monitor, printer, memory unit, or the like.

The computing device 102 and the peripheral device 104 are coupled to one another by a communications link 106. In one embodiment, the communications link 106 may be a PCI Express link. As discussed, a PCI Express link (or bus) is built around pairs of serial (1-bit), unidirectional point-to-point connections also known as "lanes". The number of lanes can be variable and is indicated by the "x" related to the communications link 106.

In more detail, the computing device 102 may include an input/output (I/O) adapter 108 that allows for the physical connection to the communications link 106. The I/O adapter 108 may be operatively connected to a controller 110. In general, the controller 110 serves to control the operation of the I/O adapter 108. The controller 110 can be integrally formed or separate from the I/O adapter 108. In more detail, the controller 110 controls the creation, transmission, and reception of data packets transferred between the computing device 102 and the peripheral device 104 over the communications link 106. The controller 110 may also handle the creation and transmission of flow control credits and transaction layer packets, among other things. In embodiments, the I/O adapter 108 can be a PCIe adapter. The controller 110 may include one or more processing circuits that can be configured to execute processes as further described herein based on program instructions that establish configuration, layout, timing, and/or other functional characteristics of the controller 110 as parallel and/or sequential operations.

The peripheral device 104 may also include an I/O adapter 112 and a controller 114. The I/O adapter 112 may be operatively connected to the controller 114 of the peripheral device 104. In general, the controller 114 serves to control the operation of the I/O adapter 112. The controller 114 can be integrally formed or separate from the I/O adapter 112. In more detail, the controller 114 controls the creation, transmission, and reception of data packets transferred between the peripheral device 104 and the computing device 102 over the communications link 106. The controller 114 may also handle the creation and transmission of flow control credits and transaction layer packets, among other things. In embodiments, the I/O adapter 112 can be a PCIe adapter. The controller 114 may include one or more processing circuits that can be configured to execute processes as further described herein based on program instructions that establish configuration, layout, timing, and/or other functional characteristics of the controller 114 as parallel and/or sequential operations.

Figure 2:
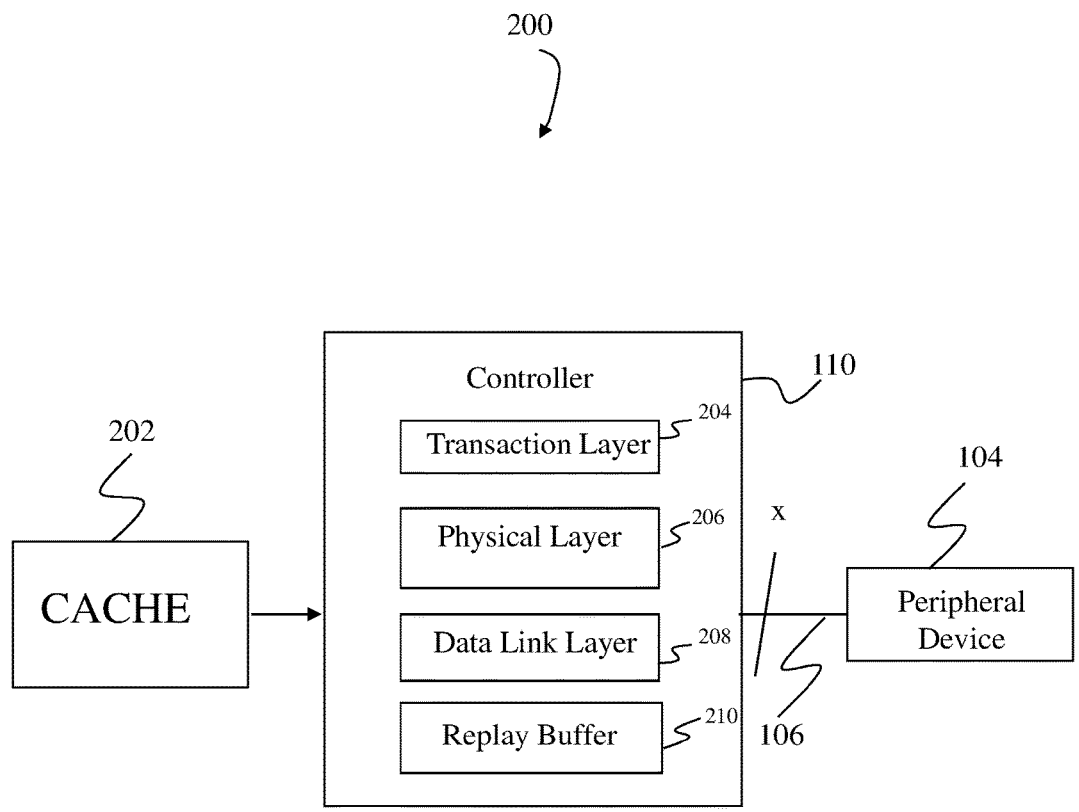
FIG. 2 illustrates a more detailed depiction of a portion of the system shown in FIG. 1 in accordance with an embodiment.

FIG. 2 depicts a block diagram of a portion of the system 100 shown in FIG. 1 in more detail as system 200. In particular, the system 200 includes a cache 202 coupled to controller 110. Information and commands to be transferred from the computing device 102 (FIG. 1) can be stored in the cache 202. The controller 110 handles the transmission of information to the peripheral device 104 via the communications link 106.

The controller 110 can implement, among other things, the PCI Express protocol. In addition, the controller 110 is configured to implement some or all of the aspects of embodiments.

The PCI Express protocol defines a transaction layer 204, a data link layer 208, and a physical layer 206. These layers 204-208 may also be present in the peripheral device 104. As shown, the controller 110 also includes a replay buffer 210. In general, the replay buffer 210 stores packets that have been sent by the controller 110 to the peripheral device 104 until the peripheral device 104 acknowledges receipt of the packets with a defined "ACK" indicator. In the event that a receipt is not acknowledged, one or more packets can be resent from the replay buffer 210.

The transaction layer 204 assembles packets of transaction requests, such as reads and writes, from the computing device 102 (FIG. 1). In common usage, these requests may be said to be received from the "core". Header information is added to the transaction requests, to produce transaction layer packets (TLPs). The data link layer 208 applies a data protection code, such as a cyclic redundancy check (CRC), and assigns a sequence number to each TLP. At the physical layer 206, the TLP is framed and converted to a serialized format, then is transmitted across the communications link 106 at a frequency and width compatible with the peripheral device 104.

At the peripheral device 104, the process is reversed. The physical layer converts the serialized data back into packet form, and stores the extracted TLP in memory at the data link layer. The data link layer verifies the integrity of the received TLP, such as by performing a CRC check of the packet, and also confirms the sequence number of the packet. After both checks are performed, the TLP, excluding the sequence number and the data link layer CRC, is forwarded to the transaction layer. The transaction layer disassembles the packet into information (e.g., read or write requests) that is deliverable to the device core. The transaction layer also detects unsupported TLPs and may perform its own data integrity check. If the packet transmission fails, the data link layer requests retransmission of the TLP from the replay buffer 210, known as a link layer retry (LLR).

Figure 3:
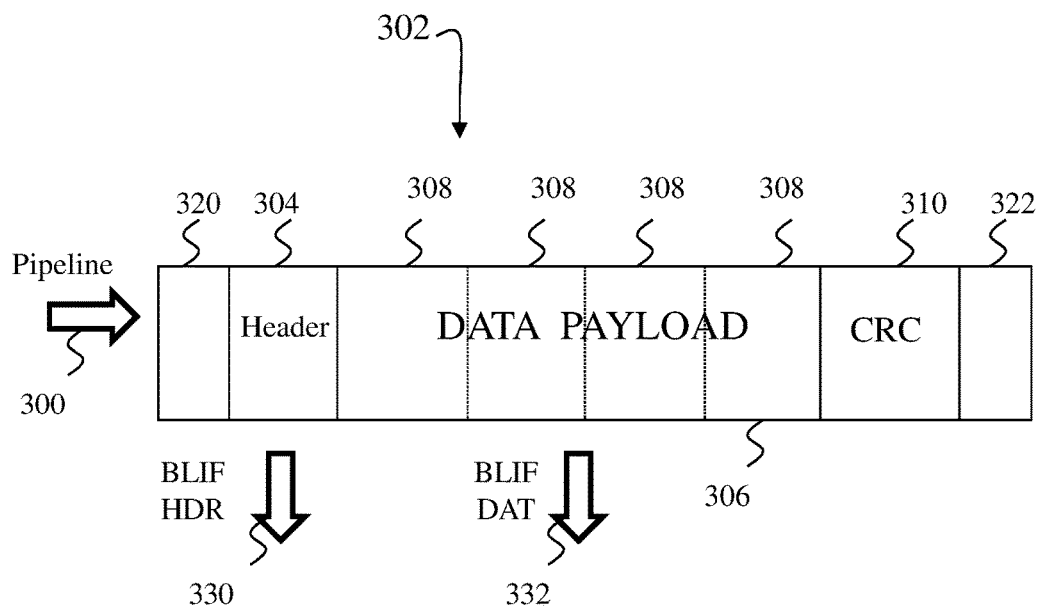
FIG. 3 illustrates an example of a packet that is received and processed in accordance with an embodiment.

FIG. 3 illustrates a packet received and processed in accordance with an embodiment. A packet 302 can be received on a pipeline 300 in a single clock cycle or spread across multiple clock cycles. The packet 302 can include a header portion 304, a payload portion 306, and cyclical redundancy check (CRC) portion 310 used for error detection and correction. The packet 302 may also include framing symbols marking the beginning 320 and the end 322 of the first packet 302. The payload portion 306 can be divided by multiple boundaries 308. Each boundary 308 can be a fixed distance from its nearest neighbor. In one embodiment, the distance between each boundary 308 is the width of the interface supplying the data.

The header portion 304 of the packet 302 can be routed through a buffer layer header interface 330 for a downstream use that may be a 16 byte wide bus. The payload portion 306 of the packet 302 can be routed through a buffer layer data interface 332 for a downstream use that may be a 32 byte wide bus. The downstream use may include further buffering in local memory of the computing device 102 of FIG. 1, for instance. The header portion 304 can provide processing and formatting information relative to the payload portion 306.

Figure 4:
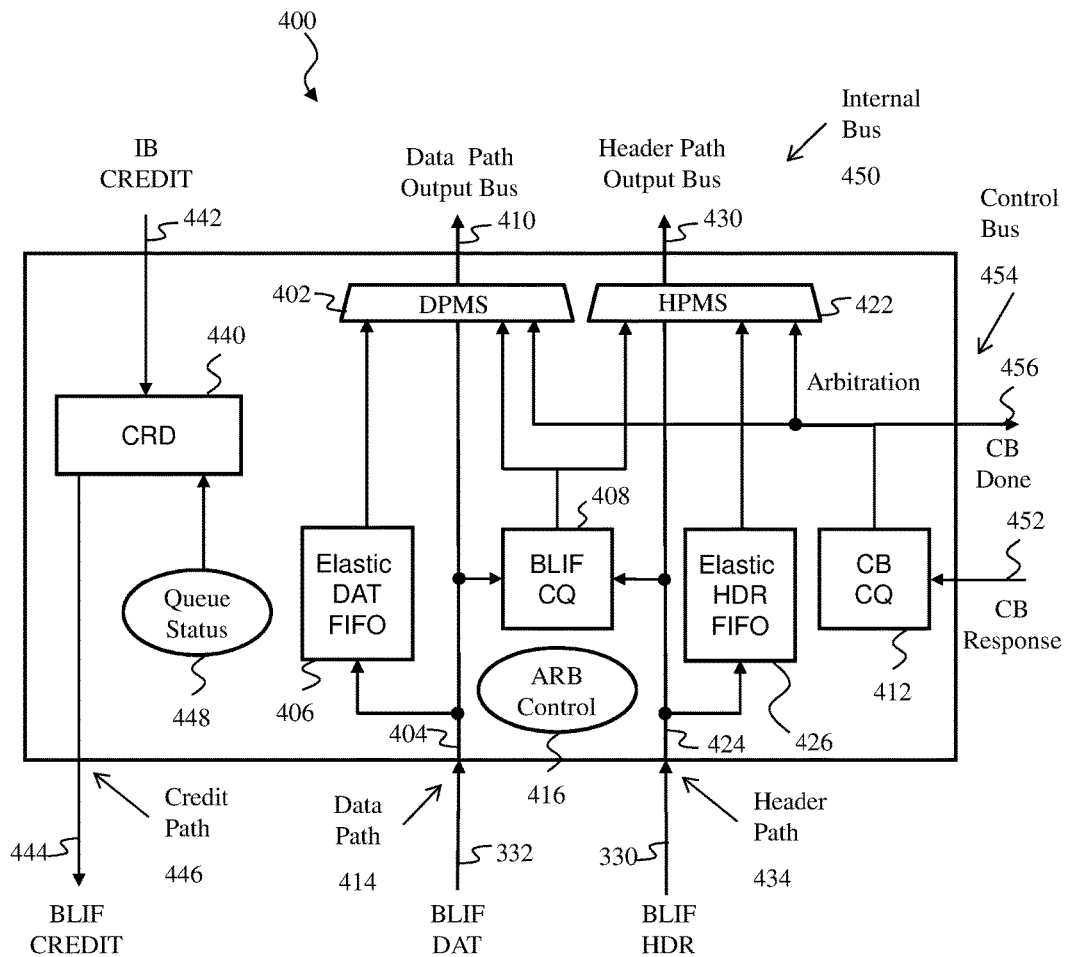
FIG. 4 illustrates a system for insertion of data in a multi-source data processing pipeline with elastic FIFO structures in accordance with an embodiment.

FIG. 4 illustrates a system 400 for insertion of data in a multi-source data processing pipeline with elastic FIFO structures. The system 400 is described in reference to the I/O adapter 108 and controller 110 of the computing device 102 of FIG. 1, but can be incorporated in other devices, such as the I/O adapter 112 and controller 114 of the peripheral device 104 of FIG. 1. For example, the I/O adapter 108 and/or the I/O adapter 112 of FIG. 1 can each include at least one multi-source selector coupled to a flow-through input, an elastic FIFO structure, a completion queue, and an output bus. In the embodiment of FIG. 4, the system 400 includes a data path multi-source selector 402 coupled to a data path flow-through input 404, a data path elastic FIFO structure 406, a completion queue 408, and a data path output bus 410. A control bus completion queue 412 can also be coupled to the data path multi-source selector 402. A data path 414 provides data values from the buffer layer data interface 332 to the data path flow-through input 404. An arbitration control 416 can selectively provide data values from the data path flow-through input 404 to the data path elastic FIFO structure 406 and provide completions from the data path flow-through input 404 to the completion queue 408. The system 400 can also include a header path multi-source selector 422 coupled to a header path flow-through input 424, a header path elastic FIFO structure 426, the completion queue 408, and a header path output bus 430. The control bus completion queue 412 can also be coupled to the header path multi-source selector 422. A header path 434 provides data values from the buffer layer header interface 330 to the header path flow-through input 424. The arbitration control 416 can selectively provide commands in header values from the header path flow-through input 424 to the header path elastic FIFO structure 426 and provide completions from the header path flow-through input 424 to the completion queue 408.

Credit control logic 440 can control a flow of credits, for instance, between internal bus credit 442 and buffer layer interface credit 444 on a credit path 446. Each operation type may have separate credits, such as a read credit, write credit, and completion credit. Queue status 448 can track the status of the completion queue 408 and the control bus completion queue 412, for instance, to provide an indication to the credit control logic 440 that a credit return associated with the flow-through inputs 404, 424 should be delayed to provide time to empty the elastic FIFO structures 406, 426. The internal bus credit 442, data path output bus 410, and header path output bus 430 can be part of an internal bus 450 of the I/O adapter 108, 112 for further processing and/or storage.

The completion queue 408 and the control bus completion queue 412 are both examples of completion queues that can temporarily store completions while waiting for a packet boundary on the data path 414 and/or header path 434 to receive a turn to output to the data path output bus 410 and/or the header path output bus 430. The completion queue 408 is operable to receive a completion packet from the data path flow-through input 404 or the header path flow-through input 424. The control bus completion queue 412 is operable to receive a control bus response 452 from a control bus 454 and output a control bus done 456 to the control bus 454 and to the data path output bus 410 or the header path output bus 430. Activity on the control bus 454 typically occurs at a much lower frequency than the data path 414 and header path 434. For example, the data path 414 and header path 434 can be gap-less or near gap-less dataflows, while the control bus 454 has extended periods of inactivity.

Figure 5:
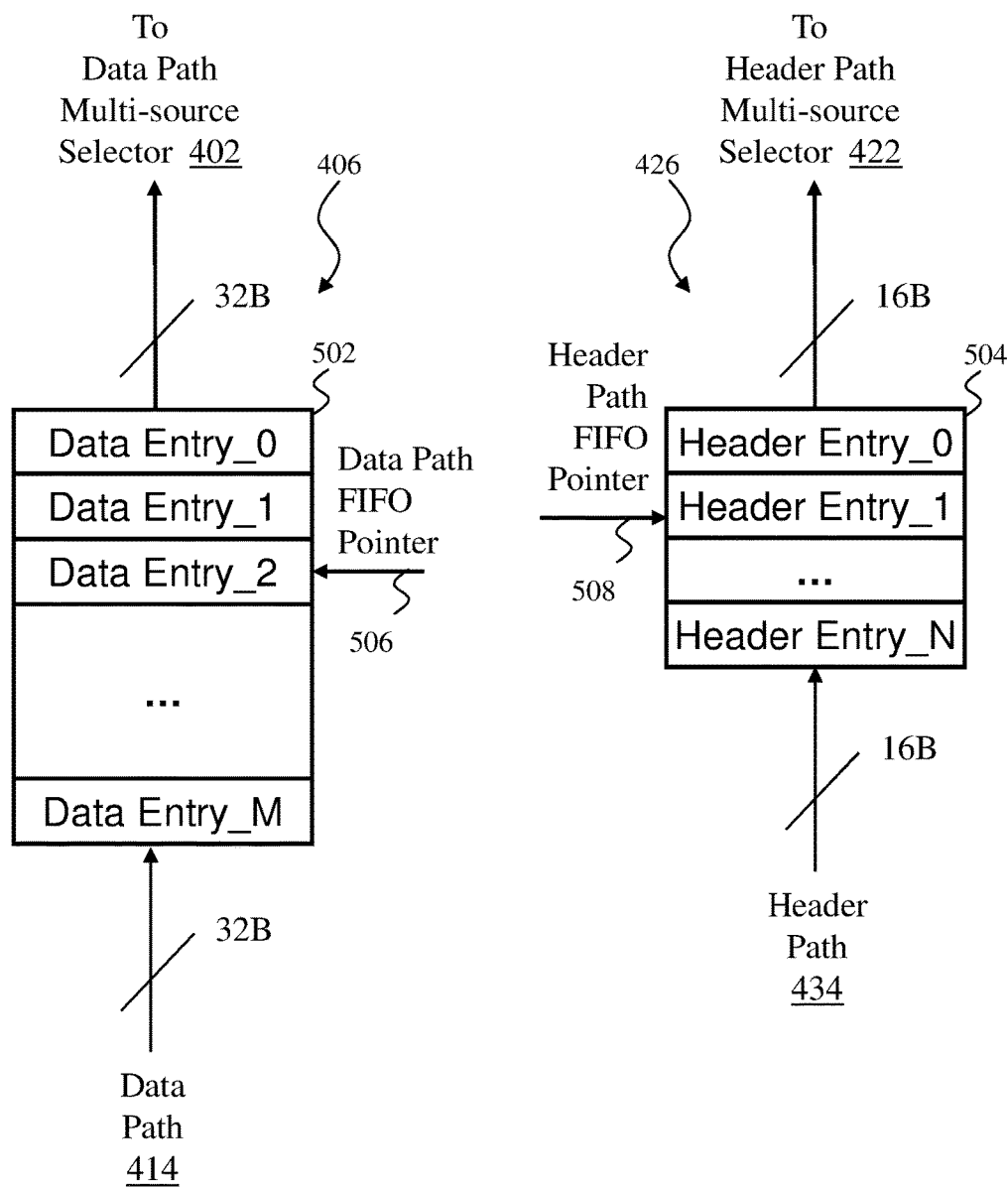
FIG. 5 illustrates a pair of elastic FIFO structures in accordance with an embodiment.

FIG. 5 illustrates a pair of elastic FIFO structures 406, 426 in accordance with an embodiment. The data path FIFO structure 406 and the header path FIFO structure 426 can be managed separately or together for a same packet. For instance, the data path 414 can provide data from a payload portion 306 to one or more entry 502 of the data path FIFO structure 406, and the header path 434 can provide a header portion 304 to one or more entry 504 of the header path FIFO structure 426 from a same packet 302 of FIG. 3. In some embodiments, the data path elastic FIFO structure 406 has a larger entry width (e.g., 32 bytes vs. 16 bytes) and a larger maximum depth (i.e., greater number of possible entries 502 vs. entries 504) than the header path elastic FIFO structure 426. Various pointers, such as one or more data path FIFO pointer 506 and one or more header path FIFO pointer 508 can be used to manage populating and removing entries 502, 504 of the elastic FIFO structures 406, 426.

Figure 6:
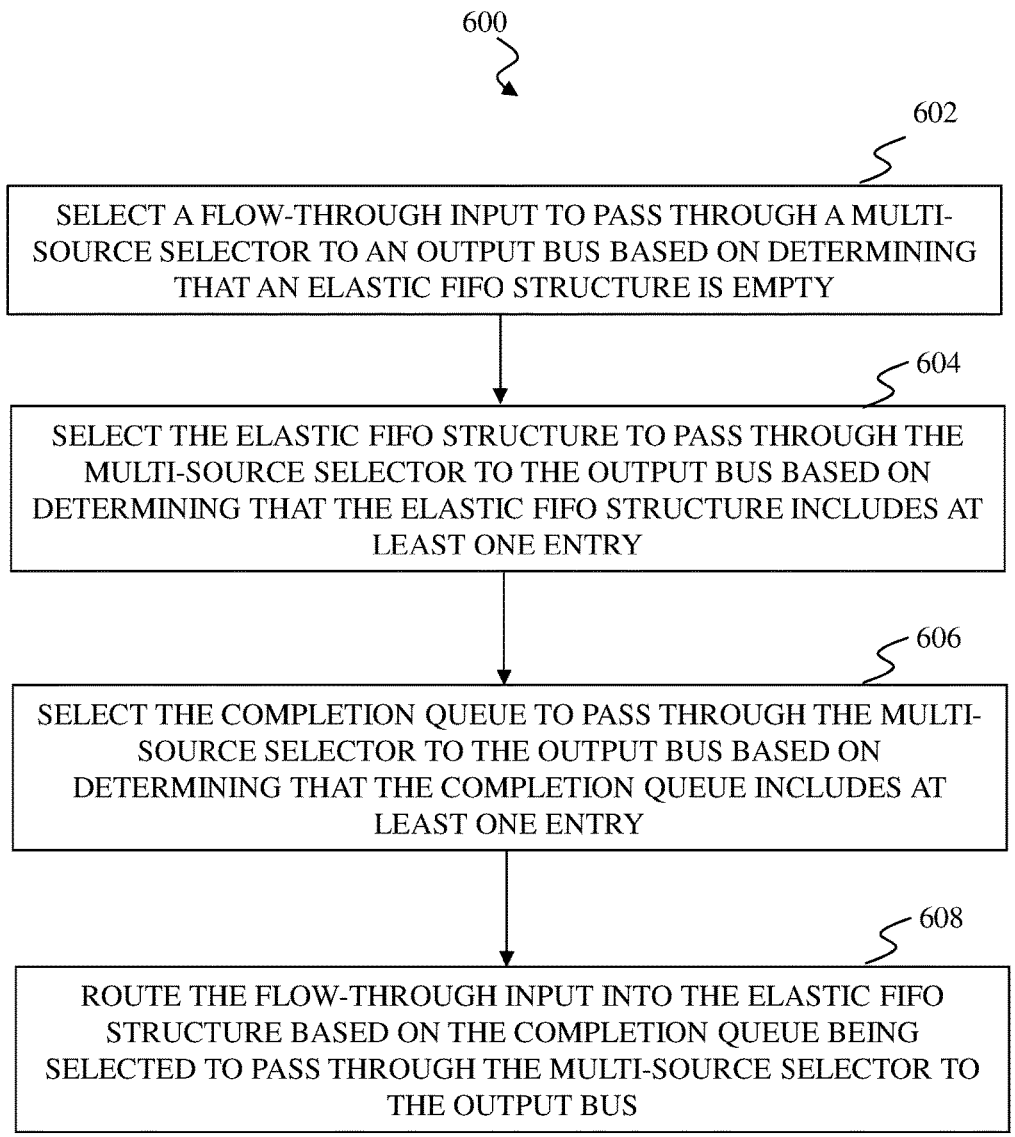
FIG. 6 illustrates a process flow in accordance with an embodiment.

Turning now to FIG. 6, a flow diagram of a process 600 is generally shown in accordance with an embodiment. The process 600 is described with reference to FIGS. 1-6 and may include additional steps beyond those depicted in FIG. 6. Although described in reference to controller 110, it will be understood that the process 600 can be performed by other controllers, such as controller 114. The controller 110 can implement the process 600 using a combination of the arbitration control 416, the credit control logic 440, the queue status 448, and other indicators and/or logic in embodiments. A general example is described with respect to FIG. 6.

At block 602, the controller 110 selects a flow-through input to pass through a multi-source selector to an output bus based on determining that an elastic FIFO structure is empty. At block 604, the controller 110 selects the elastic FIFO structure to pass through the multi-source selector to the output bus based on determining that the elastic FIFO structure includes at least one entry. The controller 110 can delay a credit return associated with the flow-through input to provide time to empty the elastic FIFO structure. At block 606, the controller 110 selects the completion queue to pass through the multi-source selector to the output bus based on determining that the completion queue includes at least one entry. The completion queue can be selected to pass through the multi-source selector to the output bus on a packet boundary of packet data received at the flow-through input. At block 608, the controller 110 routes the flow-through input into the elastic FIFO structure based on the completion queue being selected to pass through the multi-source selector to the output bus.

In embodiments, the control bus completion queue 412 of FIG. 4 can be configured to pass through the multi-source selector to the output bus based on determining that the control bus completion queue includes at least one entry. The flow-through input can be routed into the elastic FIFO structure based on the control bus completion queue 412 being selected to pass through the multi-source selector to the output bus.

The process 600 of FIG. 6 can be implemented for the data path 414, the header path 434, or a combination therefore. For example, the multi-source selector can be the data path multi-source selector 402, the flow-through input can be a data path flow-through input 404, the elastic FIFO structure can be a data path elastic FIFO structure 406, and the output bus can be a data path output bus 410. The I/O adapter (e.g., I/O adapter 108, 112) may also include a header path multi-source selector 422 coupled to a header path flow-through input 424, a header path elastic FIFO structure 426, the completion queue 408, and a header path output bus 430 as depicted in FIG. 4.

The header path flow-through input 424 can be passed through the header path multi-source selector 422 to the header path output bus 430 based on determining that the header path elastic FIFO structure 426 is empty. The header path elastic FIFO structure 426 can be set to pass through the header path multi-source selector 422 to the header path output bus 430 based on determining that the header path elastic FIFO structure 426 includes at least one entry 504 of FIG. 5. The completion queue 408 can be selected to pass through the header path multi-source selector 422 to the header path output bus 430 based on determining that the completion queue 408 includes at least one entry. The header path flow-through input 424 can be routed into the header path elastic FIFO structure 426 based on the completion queue 408 being selected to pass through the header path multi-source selector 422 to the header path output bus 430.

The data path elastic FIFO structure 406 and the header path elastic FIFO structure 426 can be managed together for a same packet 302 providing data from a payload portion 306 to the data path elastic FIFO structure 406 and a header portion 304 to the header path elastic FIFO structure 426. The data path elastic FIFO structure 406 can have a larger entry width (e.g., 32 bytes vs 16 bytes) and a larger maximum depth (e.g., over 100 entries vs. less than 100 entries) than the header path elastic FIFO structure 426.

The I/O adapter (e.g., I/O adapter 108, 112) can include a control bus completion queue 412 coupled to the header path multi-source selector 422 and the data path multi-source selector 402. The control bus completion queue 412 can be selected to pass through the header path multi-source selector 422 to the header path output bus 430 based on determining that the control bus completion queue 412 includes at least one entry for the header path output bus 430. The header path flow-through input 424 can be routed into the header path elastic FIFO structure 426 based on the control bus completion queue 412 being selected to pass through the header path multi-source selector 422 to the header path output bus 430. Similarly, the control bus completion queue 412 can be selected to pass through the data path multi-source selector 402 to the data path output bus 410 based on determining that the control bus completion queue 412 includes at least one entry for the data path output bus 410. The data path flow-through input 404 can be routed into the data path elastic FIFO structure 406 based on the control bus completion queue 412 being selected to pass through the data path multi-source selector 402 to the data path output bus 410.

Figure 7:
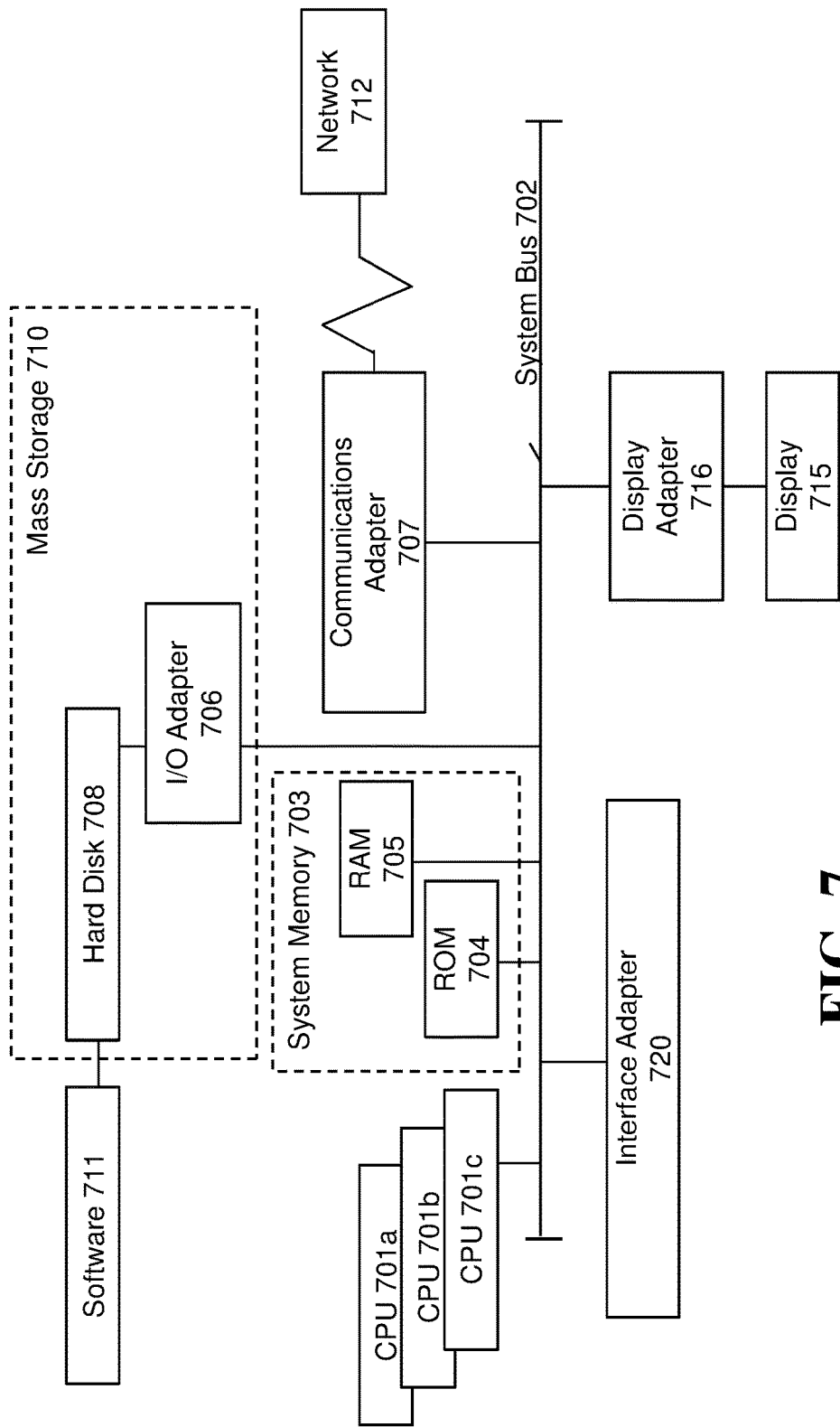
FIG. 7 illustrates a processing system in accordance with an embodiment.

Referring now to FIG. 7, there is shown an embodiment of a processing system 700 for implementing the teachings herein. In this embodiment, the processing system 700 has one or more central processing units (processors) 701a, 701b, 701c, etc. (collectively or generically referred to as processor(s) 701). The processors 701 can be an embodiment of the computing device 102 of FIG. 1. The processors 701, also referred to as processing circuits, are coupled via a system bus 702 to a system memory 703 and various other components. The system memory 703 can include read only memory (ROM) 704 and random access memory (RAM) 705. The ROM 704 is coupled to system bus 702 and may include a basic input/output system (BIOS), which controls certain basic functions of the processing system 700. RAM 705 is read-write memory coupled to system bus 702 for use by the processors 701.

FIG. 7 further depicts an input/output (I/O) adapter 706 and a communications adapter 707 coupled to the system bus 702. I/O adapter 706 may be a small computer system interface (SCSI) adapter that communicates with a hard disk 708 and/or any other similar component. I/O adapter 706 and hard disk 708 are collectively referred to herein as mass storage 710. Alternatively, the I/O adapter 706 and/or the communications adapter 707 can be embodiments of the I/O adapter 108 or I/O adapter 112. Software 711 for execution on the processing system 700 may be stored in mass storage 710. The mass storage 710 is an example of a tangible storage medium readable by the processors 701, where the software 711 is stored as instructions for execution by the processors 701 to perform a method, such as the process flow 600 of FIG. 6. Communications adapter 707 interconnects the system bus 702 with an outside network 712 enabling processing system 700 to communicate with other such systems. A display 715 is connected to system bus 702 via a display adapter 716, which may include a graphics controller to improve the performance of graphics intensive applications and a video controller. In one embodiment, adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include protocols, such as PCIe. Additional input/output devices can be connected to the system bus 702 via an interface adapter 720 and the display adapter 716. A keyboard, mouse, speaker can be interconnected to the system bus 702 via the interface adapter 720, which may include, for example, a Super I/O chip integrating multiple device adapters into a single integrated circuit.

Thus, as configured in FIG. 7, the processing system 700 includes processing capability in the form of processors 701, and, storage capability including the system memory 703 and the mass storage 710, input means such as keyboard and mouse, and output capability including speaker and the display 715. In one embodiment, a portion of the system memory 703 and the mass storage 710 collectively store an operating system, such as the z/OS or AIX operating system from IBM Corporation, to coordinate the functions of the various components shown in FIG. 7.

Technical effects and benefits include flow control of insertion of data in a multi-source data processing pipeline with an elastic FIFO in a computer system. Multiple sources of data, such as packet data, completion data, and/or control data can be selectively passed through one or more buses using one or more elastic FIFOs and credit management/withholding to ensure flow-through inputs have a reduced latency while giving an alternate data type opportunities to share one or more output buses within an I/O adapter or similar device.

Embodiments may include a system and/or a method at any possible technical detail level of integration. The system may include a computer readable storage medium (or media) having computer readable program instructions thereon for causing a processor to carry out aspects of the embodiments herein. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   an input/output adapter comprising:
      a data path multi-source selector coupled to a data path flow-through input, a data path elastic first-in-first-out (FIFO) structure, a completion queue, and a data path output bus; and
      a header path multi-source selector coupled to a header path flow-through input, a header path elastic FIFO structure, the completion queue, and a header path output bus; and
   a controller operatively connected to the input/output adapter, the controller operable to perform:
      selecting the data path flow-through input to pass through the data path multi-source selector to the data path output bus based on determining that the data path elastic FIFO structure is empty;
      selecting the data path elastic FIFO structure to pass through the data path multi-source selector to the data path output bus based on determining that the data path elastic FIFO structure includes at least one entry;
      selecting the completion queue to pass through the data path multi-source selector to the data path output bus based on determining that the completion queue includes at least one entry; and
      routing the data path flow-through input into the data path elastic FIFO structure based on the completion queue being selected to pass through the data path multi-source selector to the data path output bus.

2. The system of claim 1, wherein the input/output adapter is a peripheral component interconnect express (PCIe) adapter.

3. The system of claim 1, wherein selecting the completion queue to pass through the data path multi-source selector to the data path output bus is performed on a packet boundary of packet data received at the data path flow-through input.

4. The system of claim 1, wherein the controller is operable to delay a credit return associated with the data path flow-through input to provide time to empty the data path elastic FIFO structure.

5. The system of claim 1, wherein the controller is operable to perform:
   selecting the header path flow-through input to pass through the header path multi-source selector to the header path output bus based on determining that the header path elastic FIFO structure is empty;
   selecting the header path elastic FIFO structure to pass through the header path multi-source selector to the header path output bus based on determining that the header path elastic FIFO structure includes at least one entry;
   selecting the completion queue to pass through the header path multi-source selector to the header path output bus based on determining that the completion queue includes at least one entry; and
   routing the header path flow-through input into the header path elastic FIFO structure based on the completion queue being selected to pass through the header path multi-source selector to the header path output bus.

6. The system of claim 5, wherein the data path elastic FIFO structure and the header path elastic FIFO structure are managed together for a same packet providing a data payload to the data path elastic FIFO structure and a header to the header path elastic FIFO structure, and further wherein the data path elastic FIFO structure has a larger entry width and a larger maximum depth than the header path elastic FIFO structure.

7. The system of claim 5, wherein the input/output adapter further comprises a control bus completion queue coupled to the header path multi-source selector and the data path multi-source selector, and the controller is further operable to perform:
   selecting the control bus completion queue to pass through the header path multi-source selector to the header path output bus based on determining that the control bus completion queue includes at least one entry for the header path output bus;
   routing the header path flow-through input into the header path elastic FIFO structure based on the control bus completion queue being selected to pass through the header path multi-source selector to the header path output bus;
   selecting the control bus completion queue to pass through the data path multi-source selector to the data path output bus based on determining that the control bus completion queue includes at least one entry for the data path output bus; and
   routing the data path flow-through input into the data path elastic FIFO structure based on the control bus completion queue being selected to pass through the data path multi-source selector to the data path output bus.

8. A method comprising:
   selecting, by a controller operatively connected to an input/output adapter, a data path flow-through input to pass through a data path multi-source selector to a data path output bus based on determining that a data path elastic first-in-first-out (FIFO) structure is empty, wherein the data path multi-source selector of the input/output adapter is coupled to the data path flow-through input, the data path elastic FIFO structure, a completion queue, and the data path output bus, wherein the input/output adapter further comprises a header path multi-source selector coupled to a header path flow-through input, a header path elastic FIFO structure, the completion queue, and a header path output bus;

selecting the data path elastic FIFO structure to pass through the data path multi-source selector to the data path output bus based on determining that the data path elastic FIFO structure includes at least one entry;

selecting the completion queue to pass through the data path multi-source selector to the data path output bus based on determining that the completion queue includes at least one entry; and routing the data path flow-through input into the data path elastic FIFO structure based on the completion queue being selected to pass through the data path multi-source selector to the data path output bus.

9. The method of claim 8, wherein the input/output adapter is a peripheral component interconnect express (PCIe) adapter.

10. The method of claim 8, wherein selecting the completion queue to pass through the data path multi-source selector to the data path output bus is performed on a packet boundary of packet data received at the data path flow-through input.

11. The method of claim 8, further comprising:
delaying a credit return associated with the data path flow-through input to provide time to empty the data path elastic FIFO structure.

12. The method of claim 8, further comprising:
selecting the header path flow-through input to pass through the header path multi-source selector to the header path output bus based on determining that the header path elastic FIFO structure is empty;
selecting the header path elastic FIFO structure to pass through the header path multi-source selector to the header path output bus based on determining that the header path elastic FIFO structure includes at least one entry;
selecting the completion queue to pass through the header path multi-source selector to the header path output bus based on determining that the completion queue includes at least one entry; and
routing the header path flow-through input into the header path elastic FIFO structure based on the completion queue being selected to pass through the header path multi-source selector to the header path output bus.

13. The method of claim 12, wherein the data path elastic FIFO structure and the header path elastic FIFO structure are managed together for a same packet providing a data payload to the data path elastic FIFO structure and a header to the header path elastic FIFO structure, and further wherein the data path elastic FIFO structure has a larger entry width and a larger maximum depth than the header path elastic FIFO structure.

14. The method of claim 12, further comprising:
selecting a control bus completion queue to pass through the header path multi-source selector to the header path output bus based on determining that the control bus completion queue includes at least one entry for the header path output bus, wherein the control bus completion queue is coupled to the header path multi-source selector and the data path multi-source selector;
routing the header path flow-through input into the header path elastic FIFO structure based on the control bus completion queue being selected to pass through the header path multi-source selector to the header path output bus;
selecting the control bus completion queue to pass through the data path multi-source selector to the data path output bus based on determining that the control bus completion queue includes at least one entry for the data path output bus; and
routing the data path flow-through input into the data path elastic FIFO structure based on the control bus completion queue being selected to pass through the data path multi-source selector to the data path output bus.

15. A computer program product comprising a computer readable storage medium having program instructions embodied therewith, the program instructions executable by a processing circuit of a controller to cause the processing circuit to perform:
selecting, by the controller operatively connected to an input/output adapter, a data path flow-through input to pass through a data path multi-source selector to a data path output bus based on determining that a data path elastic first-in-first-out (FIFO) structure is empty, wherein the data path multi-source selector of the input/output adapter is coupled to the data path flow-through input, the data path elastic FIFO structure, a completion queue, and the data path output bus, wherein the input/output adapter further comprises a header path multi-source selector coupled to a header path flow-through input, a header path elastic FIFO structure, the completion queue, and a header path output bus;
selecting the data path elastic FIFO structure to pass through the data path multi-source selector to the data path output bus based on determining that the data path elastic FIFO structure includes at least one entry;
selecting the completion queue to pass through the data path multi-source selector to the data path output bus based on determining that the completion queue includes at least one entry; and
routing the data path flow-through input into the data path elastic FIFO structure based on the completion queue being selected to pass through the data path multi-source selector to the data path output bus.

16. The computer program product of claim 15, wherein selecting the completion queue to pass through the data path multi-source selector to the data path output bus is performed on a packet boundary of packet data received at the data path flow-through input.

17. The computer program product of claim 15, wherein the program instructions further cause the processing circuit to perform:
delaying a credit return associated with the data path flow-through input to provide time to empty the data path elastic FIFO structure.

18. The computer program product of claim 15, wherein the program instructions further cause the processing circuit to perform:
selecting the header path flow-through input to pass through the header path multi-source selector to the header path output bus based on determining that the header path elastic FIFO structure is empty;
selecting the header path elastic FIFO structure to pass through the header path multi-source selector to the header path output bus based on determining that the header path elastic FIFO structure includes at least one entry;

selecting the completion queue to pass through the header path multi-source selector to the header path output bus based on determining that the completion queue includes at least one entry; and routing the header path flow-through input into the header path elastic FIFO structure based on the completion queue being selected to pass through the header path multi-source selector to the header path output bus.

19. The computer program product of claim 18, wherein the data path elastic FIFO structure and the header path elastic FIFO structure are managed together for a same packet providing a data payload to the data path elastic FIFO structure and a header to the header path elastic FIFO structure, and further wherein the data path elastic FIFO structure has a larger entry width and a larger maximum depth than the header path elastic FIFO structure.

20. The computer program product of claim 18, wherein the program instructions further cause the processing circuit to perform:

selecting a control bus completion queue to pass through the header path multi-source selector to the header path output bus based on determining that the control bus completion queue includes at least one entry for the header path output bus, wherein the control bus completion queue is coupled to the header path multi-source selector and the data path multi-source selector;

routing the header path flow-through input into the header path elastic FIFO structure based on the control bus completion queue being selected to pass through the header path multi-source selector to the header path output bus;

selecting the control bus completion queue to pass through the data path multi-source selector to the data path output bus based on determining that the control bus completion queue includes at least one entry for the data path output bus; and routing the data path flow-through input into the data path elastic FIFO structure based on the control bus completion queue being selected to pass through the data path multi-source selector to the data path output bus.

* * * * *